106. COMPOSITIONS, COATING OR PLASTIC.

75 Patented Aug. 29, 1939

2,171,290

UNITED STATES PATENT OFFICE 2,171,290

METHOD OF MAKING CLAY PRODUCTS

Floyd B. Hobart, Columbus, Ohio, assignor to Battelle Memorial Institute, Columbus, Ohio, a corporation of Ohio No Drawing. Application January 14, 1937, Serial No. 120,614

5 Claims. (Cl. 106—21)

My invention relates to clay products and method of making the same. It has to do with the making of light-weight clay products, though it is not necessarily limited thereto. It relates especially to the making of light-weight bricks or blocks which are particularly adapted for use in connection with heat or sound insulation, though it is capable of application to the making of units or aggregate to be used for structural purposes.

In the prior art, various attempts have been made to produce light-weight clay products of the type indicated. Some of these attempts have involved the mixing of clay and organic material, such as sawdust or ground cork, with water to produce a plastic mass which is molded, dried, and then fired, with the organic material being burnt out during the firing operation. One difficulty arising in this process is that heat is generated by the burning out of the combustible material and this tends to prevent uniform firing of the products.

Other efforts have involved the production of clay products of more or less cellular form, with the cell construction being formed therein by mixing the clay-like materials with reacting chemicals which produce gases within the body and cause it to be filled with a multiplicity of small bubbles. Most of these methods have required the use with the clay of appreciable amounts of setting material, such as plaster of Paris, to fix and hold the shape of the body in its porous condition until removal of the water of the mixture can be accomplished by a drying operation. These appreciable amounts of setting materials have a deleterious effect upon the high-temperature resisting properties of the resultant product.

One object of this invention is to provide a method of making a light-weight clay product which will be simple and readily controllable so that a product can be produced of any definite size and with a minimum of difficulty.

Another object of this invention is to provide a method of making a light-weight clay product which may be fired in the ordinary manner and with the usual firing temperatures, without complication from the necessity of burning out organic materials.

Another object of this invention is to provide a light-weight clay product which is of cellular form and which has high heat and sound insulating properties.

Various other objects of this invention will appear as this description progresses.

This application is a continuation in part of my application Serial No. 706,568, filed January 13, 1934, for Clay products and method of making the same.

My invention preferably contemplates the making of a light-weight ceramic product by the suspension of finely divided particles of clay or like materials in a liquid, the foaming of such liquid suspension and the introduction, after foaming, of suitable materials for the conversion of the foamed mass to a condition in which it will be self-sustaining before drying has progressed to any material extent. My invention further contemplates that this conversion of the foamed mass to a self-sustaining condition shall be delayed for a period of time sufficient to permit the material to be cast into molds or otherwise formed in the desired shape.

More specifically, my invention preferably contemplates the creation of conditions wherein the clay in suspension will react with an introduced soluble silicate to effect gelation and conversion of the suspension to a solid phase so that it will retain its shape upon removal of the molds without slumping or distortion. I have found that the clay in a water suspension will react with a soluble silicate of proper silica ratio to form a silicate jelly, provided the pH of the mixture of clay and water is properly selected or adjusted. I have also found that, if this mixture of clay and water has a suitable pH, the gelation phenomenon will be sufficiently delayed to permit thorough mixing in of the soluble silicate with consequent improvement in the product. Likewise, I have found that gelation may be delayed with a consequent improvement in the gelled structure by the use of a soluble silicate in powdered form, which also increases the time available for mixing of the silicate with the clay liquid suspension and for casting or otherwise forming.

Certain clay materials have the ability to react with sodium silicate to form complex silicates or to exchange ions and replace the sodium ion of the silicate with another base. When sodium silicate solutions of proper concentration are caused to react with acids or certain other chemicals under proper conditions the solutions become gelled. The time required for this gelation to occur depends upon several factors, among them concentration, temperature and acidity or alkalinity of the gelling solution, i. e., the pH of the solution. At a pH near neutrality with other conditions suitable the gelation of such a solution occurs quickly while at increasingly higher or lower pH values the time becomes longer until at a sufficiently high or low pH value it becomes infinite. Thus, it is possible to effect gelation of a soluble silicate by introducing it into a clay water suspension which is either alkaline or acidic, provided the clay in the suspension possesses the required qualities.

It is possible, though not probable, that some clays in water suspensions will possess characteristics bringing these suspensions within the proper pH range for effecting gelation. However, with the clays that I have tested, I have found it necessary to initially add to the clay suspension a chemical or chemicals to bring the suspension into that pH range best suited for effecting gelation.

Furthermore, I have found that though gelation may, in some cases, be effected when the clay suspension is suitably acidic, the phenomenon is more readily controllable if the clay suspension is suitably alkaline in nature. Thus, as an initial step in my process, I preferably introduced one or more soluble alkalies, such as sodium hydroxide or sodium carbonate, into the clay suspension in sufficient quantity so that the mixture will have the proper alkalinity. In such a mixture, the clay will best react with the subsequently introduced soluble silicate to bring about gelation thereof.

Having created this proper pH in the clay suspension and foamed the mixture, I then preferably introduce sodium silicate. Moreover, I prefer to introduce this sodium silicate in powdered form so that the gelation phenomenon will be delayed sufficiently to facilitate mixing in of the silicate and casting, molding or other formation of the units to proper shape.

In using a plastic fire clay from southern Ohio, which is acidic, having a pH of about 4.2 when slacked in neutral water, I have obtained good results with alkaline control. I have used this clay in the following manner:

| | Parts |
|---|---|
| Water solution of 1% sodium hydroxide | 27 |
| Sodium oleate soap | .1 |
| Southern Ohio fire clay | 30 |
| Finely ground grog | 30 |
| Sodium silicate powder (a finely divided solid containing 19.4% Na₂O, 62.5% SiO₂ and 18.1% water of hydration) | 1 |

The ingredients were added in the order given with foaming prior to the addition of the silicate. In this mixture, the sodium hydroxide in the solution was sufficient in amount to insure the correct alkaline condition for subsequent gelation. Also, the alkalinity was such that a good dispersion of the clay and grog used was obtained, so that a minimum amount of water was required. The sodium oleate soap was added to alter the surface tension of the water and permit subsequent foaming. The mixture was quite fluid and foaming by mechanical agitation was easily accomplished. The final mixture was a smooth creamy foamed composition, due to the dispersed condition of the clay materials. It was easily poured into the molds and was allowed to stand in them for a brief period of time.

During this period of time, the sodium silicate powder dissolved and, simultaneously, the clay grog material reacted with the dissolved silicate. The result of these actions and reactions was the formation of a silicate jelly in a very short time. This gelation of the silicate caused the physical nature of the masses in the molds to be altered to such an extent that the mold sides could be removed or the shapes turned out upon pallets to dry without slumping or distortion. In other words, due to their gelled condition, the shape units had become self-sustaining and retained the shapes produced by the molds without support from such molds.

Upon drying, the units thus produced had a density of approximately 31 pounds per cubic foot and a crushing strength of 26 pounds per square inch. With subsequent firing, in accordance with common ceramic practice, the units became slightly more dense, owing to shrinkage in volume during the firing operation.

In the form of my method just detailed, I have described the use of sodium hydroxide as an agent which increased the alkalinity of the suspension and, incidentally, acted as a dispersing agent. My tests determined that the amount of sodium hydroxide had an important effect on gelation and that substantially less or substantially more of the sodium hydroxide than the amount specified interfered with proper gelation. Thus, the introduction of the correct amount of sodium hydroxide resulted in the production of a mixture of proper alkalinity to permit the subsequent gelation. When the sodium silicate was added, it became gelled by means of reactions with constituents of the clay.

In many cases, other chemicals may be used to advantage, instead of sodium hydroxide, to control the pH of the clay suspension. It has been found that sodium hydroxide is too strongly alkaline for control in the high pH range with some clays. With such clays, weaker alkalies such as sodium carbonate and ammonia have been used with success. Mixtures of sodium hydroxide and sodium carbonate have been used to advantage with certain specific clays. I have also obtained improved results with mixtures of sodium hydroxide and traces of sodium silicate with certain clays.

There are other chemicals that might be used to advantage for the purpose of bringing the clay suspension to the proper pH value. Among these are organic bases. Where the mixture is to be controlled within the lower pH range, an acid would be used. From this, it will be seen that the proper choice of chemicals used in my process for initially adjusting the pH of the clay suspension requires careful consideration and should be suited to the conditions in each case. In many cases, the choice of chemicals for controlling the pH of the clay suspension may be such as to give dispersion of the clay materials to facilitate foaming, though this is not always the case.

A dispersed ceramic suspension in water solution has high fluidity and mobility. I prefer the dispersion of the ceramic suspension because it is more easily foamed, it gives a stronger fired produce and there is less water used so that the amount of drying required is decreased and minimum shrinkage results.

Clays which have been found suitable for use in my process include southern Ohio fire clays from four different clay mines which, though they are presumably from the same geological formation, require individually, specific amounts of alkali to give goods results. This was also true of Brookville clay from Perry County, Ohio, Bedford shale and Minford silt from Franklin County, Ohio, a surface clay from Delaware County, Ohio, a semiflint clay from Olive Hill, Kentucky, a plastic fire clay from Walker County, Pennsylvania, a plastic kaolin from Florida, a plastic clay from Georgia, a fire clay from northern Illinois and a fire clay from Vandalia, Missouri.

In the application of my process, I preferably first determine the chemical requirements necessary to give to the suspension of the clay, mixture of clays or of clays and grogs which is to be used the alkalinity or acidity which is necessary, so that, upon the subsequent addition of sodium silicate, gelation will occur. I have found that a definite pH must be obtained or approximated with each suspension, and that the choice of chemicals to attain this condition with each clay suspension is dictated by the nature of the clay or clay mixture which is used. In other words, certain optimum conditions are attainable and the best results depend upon the use of the proper agents in relation to the ceramic materials used.

The foaming of my clay suspension in water may be effected in other ways than by the use of mechanical means. It may be effected by the introduction of air or even by the use of evolved gases without departing from the scope of my invention. The size of the cells may be such that they will be practically invisible to the naked eye, though they may be made larger. This will depend to some extent upon the choice of foaming agents.

Thus, my process becomes extremely simple. It obviates the necessity of adding an acid or other chemicals to suspensions of clay in soluble silicate solutions to effect gelation. Moreover, it makes possible a more positive control within the gelation stage. I preferably use sodium silicate with a soda to silica ratio of about 1:3 to 1:4, wherein the silicates are readily rendered unstable and gelation occurs as a result of reaction with the ceramic materials in the mixture.

I preferably use a sodium silicate which is in powdered form and which is slowly soluble in water, as has been specified in the example given above. A liquid sodium silicate may be used but, with some clays, it is not as desirable, since it causes a flocculating or thickening of the suspension before gelation and introduces mixing and molding difficulties. The slow solubility of the powdered sodium silicate overcomes these difficulties, since it allows ample time for mixing the silicate into the suspension and for molding while the suspension is still in a fluid condition.

However, the powdered sodium silicates are more expensive than those in liquid form and the latter should be considered when the clays and the required quality of the product render their use permissible. For example, I have found with Bedford shale from Franklin County, Ohio, and a surface clay from Delaware County, Ohio, that the addition of sufficient silicate in liquid form to cause gelation of the mixture according to my process may be made without greatly affecting the colloidal nature of the dispersion.

It appears that in the foaming of my clay suspension, the proper dispersion of the clay particles assists in forming a continuous film of these clay particles around the bubbles. The gelation of the mixture in dispersed condition produces a cellular structure wherein the cells are substantially spherical in form with smooth dense walls. By regulating the ratio of ceramic materials to the solution used in the dispersed mixture, I may make the cells non-communicating or communicating, as desired, the former being particularly desirable for heat insulation material and the latter for sound insulation material.

Though sodium silicate has, so far, been found preferable for bringing about gelation, it will be understood that other materials may accomplish the same purpose. Thus, other alkali silicates, such as potassium silicate, may be utilized for this purpose, although the present day cost is high.

Regulation of the temperature of the mixture is desirable. Elevation of the temperature may be used to promote solution and to accelerate gelation and consequent conversion to the solid phase. I have found that the heating of the material while it is in the mold by passing an alternating current therethrough is particularly effective for this purpose and may also be used to facilitate drying.

It will be seen that I have provided a superior method of producing light-weight, ceramic products by which there can be produced cellular units of any predetermined size and shape with a minimum of difficulty. Moreover, these products may be fired in the ordinary manner with the usual firing temperatures and without complication from the necessity of burning out organic materials.

However, it is within the scope of my invention to use clay which contains inherent organic matter or to add limited amounts of organic matter to the mixture which will subsequently be burned out during the firing of the product and thus aid in lightening the weight of the product. Thus, my process may be combined with the so-called "burn-out" process of making light-weight ceramic products when advantages are obtained thereby.

Furthermore, my method is such that the density of any product resulting therefrom may be effectively controlled to produce a cellular unit which is extremely light in weight but, also, unusually strong. Likewise, my method may be modified, with unusual ease, to produce units which excel either in heat insulating properties or in sound insulating properties as desired.

It will be seen that I have provided a method wherein the conversion of the foamed mixture to the solid phase may be protracted sufficiently to give ample time for casting, molding or extrusion to form units of the desired shape and, at the same time, to attain self-sustaining qualities with such promptness that the product can be set out for drying without delay.

It will also be evident that my delayed gelation permits of adequate agitation of the foamed mixture before gelation takes place. The delayed gelation also permits careful performance of the casting or forming operation before gelation begins.

After gelation has been effected, the formed units may be dried in the usual way. Following drying, the units may be fired by the usual ceramic practice, the time and temperature factors depending upon the properties of the clay or other ceramic materials which have been used.

My invention is not necessarily limited to the production of formed units. It may be utilized for the purpose of producing light-weight ceramic material which may be broken up to form light-weight aggregate. Such light-weight aggregate may be used loosely or it may be combined with some binding or cementing material for the production of bricks, blocks or slabs which have sufficient strength for building purposes or the like while, at the same time, being unusually light.

By the term "ceramic product" I mean to include products made from clay or clay-like, earthy or other mineral materials or the mixtures thereof which may be more or less plastic in a moist condition and which becomes sintered, fused or vitreous when burned at a sufficiently high temperature as for example: fire clay, kaolin, alumina minerals, silica minerals, et cetera.

By the term "grog" as used in this description, I mean to include such materials as calcined clays, ground firebrick or other clay ware and, in addiiton, the natural occurring non-plastic mineral materials such as are commonly used in the ceramic arts.

While the terms "gelation" and "flocculation" are sometimes used loosely in the art to describe the same thing, I herein use these terms to indicate different phenomena. Thus, it will be seen from the above description that my method contemplates the use of the phenomenon of gelation either of a dispersed or a flocculated ceramic suspension. The gelation phenomenon to which I refer involves the conversion of a liquid ceramic mixture to a self-sustaining unit by means of or with the aid of a soluble silicate within the mixture which is caused to become unstable and convert the mixture into a solid phase. The term "flocculation" has been used in this description to denote a change in condition which results in the changing of the clay particles in the mixture from a discontinuous to a continuous phase by the introduction of a flocculating agent which results in the collecting together of such clay particles and the consequent stiffening of the mixture.

Numerous advantages of my invention, other than those set forth specifically, will appear from the preceding description and the appended claims.

Having thus described my invention, what I claim is:

1. The method of making a ceramic product which comprises making a suspension of ceramic material in water wherein the ceramic material has been selected because of its ability to effect gelation of a soluble silicate to be subsequently introduced and wherein the suspension has a pH value suitable for attainment of gelation at a desired time, and adding the soluble silicate in powdered form to bring about gelation and consequent conversion of the suspension from a liquid to a solid phase.

2. The method of making a light-weight ceramic product which comprises making a suspension of ceramic material in water wherein the ceramic material has been selected because of its ability to effect gelation of a soluble silicate to be subsequently introduced and wherein the suspension has a pH value suitable for attainment of gelation at a desired time, foaming such suspension, and adding the soluble silicate in powdered form to bring about gelation and consequent conversion of the suspension from a liquid to a solid phase.

3. The method of making a light-weight ceramic product which comprises making a suspension of ceramic material in water wherein the ceramic material has been selected because of its ability to effect gelation of a soluble silicate to be subsequently introduced and wherein the suspension has an alkaline pH value suitable for attainment of gelation at a desired time, foaming such suspension, and adding the soluble silicate in powdered form to bring about gelation and consequent conversion of the suspension from a liquid to a solid phase.

4. The method of making a light-weight ceramic product which comprises making a suspension of ceramic material in water wherein the ceramic material has been selected because of its ability to effect gelation of a soluble silicate to be subsequently introduced, adding a chemical to adjust the pH of the suspension to an alkaline value suitable for attainment of gelation at a desired time, and adding the soluble silicate in powdered form to bring about gelation and consequent conversion of the suspension from a liquid to a solid phase.

5. The method of producing a light-weight ceramic product which comprises producing a foamed ceramic-liquid suspension and mixing therewith a slowly soluble sodium silicate powder that will slowly bring about gelation.

FLOYD B. HOBART.